United States Patent [19]

Shimodaira et al.

[11] Patent Number: 4,875,766
[45] Date of Patent: Oct. 24, 1989

[54] FIBER REINFORCED PLASTIC REFLECTOR

[75] Inventors: Hisayo Shimodaira; Toshio Ono, both of Sagamihara; Keizo Miyawaki; Tatsuya Hamaguchi, both of Amagasaki, all of Japan

[73] Assignee: Mitsubishi Denki Kabushiki Kaisha, Japan

[21] Appl. No.: 71,209

[22] Filed: Jul. 8, 1987

[30] Foreign Application Priority Data

| Jul. 18, 1986 | [JP] | Japan | 61-169153 |
| Aug. 8, 1986 | [JP] | Japan | 61-186438 |
| Aug. 8, 1986 | [JP] | Japan | 61-186439 |
| Oct. 3, 1986 | [JP] | Japan | 61-235695 |
| Oct. 3, 1986 | [JP] | Japan | 61-235696 |
| Oct. 3, 1986 | [JP] | Japan | 61-235697 |

[51] Int. Cl.$^4$ ............................ G02B 5/08; G02B 7/18
[52] U.S. Cl. ..................... 350/641; 428/186; 428/314.8; 428/912.2
[58] Field of Search ............... 350/641; 428/182, 184, 428/185, 186, 312.2, 312.8, 314.8, 912.2, 312.6, 319.1

[56] References Cited

U.S. PATENT DOCUMENTS

| 3,707,401 | 12/1972 | Jarema et al. | 428/312.2 |
| 3,839,080 | 10/1974 | Jarema et al. | 428/312.2 |
| 4,025,462 | 5/1977 | Cleveland | 428/186 |
| 4,077,853 | 3/1978 | Coll-Palagos | 428/319.1 |
| 4,124,277 | 11/1978 | Stang | 350/310 |
| 4,238,265 | 12/1980 | Deminet | 156/221 |
| 4,259,092 | 3/1981 | Matsuo et al. | 428/186 |
| 4,343,533 | 8/1982 | Currin et al. | 350/641 |
| 4,358,508 | 11/1982 | Senha et al. | 428/429 |
| 4,364,637 | 12/1982 | Ohno et al. | 350/288 |
| 4,435,043 | 3/1984 | Mertens et al. | 428/186 |
| 4,464,429 | 8/1984 | Michaud-Soret | 428/184 |
| 4,465,734 | 8/1984 | Laroche et al. | 428/417.1 |
| 4,550,986 | 11/1985 | Leach | 350/641 |
| 4,670,338 | 6/1987 | Clemino | 428/314.8 |

FOREIGN PATENT DOCUMENTS

| 3006393 | 8/1981 | Fed. Rep. of Germany | 428/312.6 |
| 3216844 | 3/1983 | Fed. Rep. of Germany . | |
| 2215631 | 8/1974 | France . | |
| 56-24302 | 7/1981 | Japan . | |
| 57-169102 | 10/1983 | Japan | 350/641 |
| 871863 | 7/1961 | United Kingdom . | |
| 1451397 | 9/1976 | United Kingdom . | |
| 1453257 | 10/1976 | United Kingdom . | |

*Primary Examiner*—Bruce Y. Arnold
*Assistant Examiner*—Martin Lerner
*Attorney, Agent, or Firm*—Leydig, Voit & Mayer

[57] ABSTRACT

A fiber reinforced plastic reflector has a sandwich construction and comprises a core, two fiber reinforced plastic plates which are secured to opposite sides of the core, and a reflecting film which is formed on the outer surface of one of the fiber reinforced plastic plates. The core is made from an isotropic material having a low density and a low linear expansion coefficient. In one form of the invention, the core is a plate of a material selected from a uniform foamed metal having a density of 0.1–1.0 g/cm$^3$; uniform, porous glass having a density of 0.05–1.0 g/cm$^3$; and a uniform, porous ceramic having a density of 0.3–1.0 g/cm$^3$. In another form of the invention, the core is a corrugated sheet and a flat sheet which is secured to at least one side of the corrugated sheet, the corrugated sheet and said flat sheet being made of a material selected from a uniform Kevlar fiber reinforced plastic having a density of 0.03–1.0 g/cm$^3$, a uniform ceramic having a density of 0.03–1.0 g/cm$^3$, and a uniform carbon fiber reinforced plastic having a density of 0.03–1.0 g/cm$^3$.

9 Claims, 3 Drawing Sheets

FIG. 3
FIG. 4
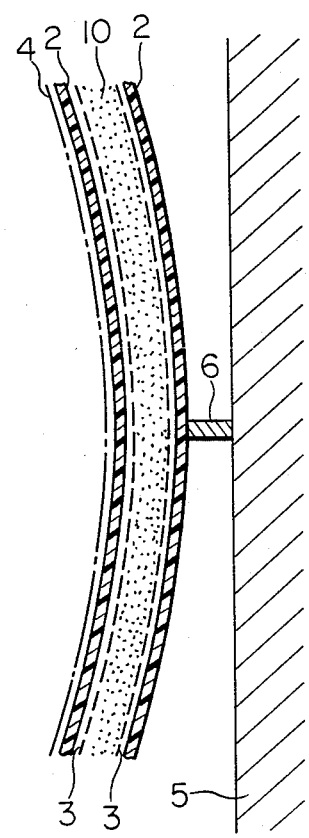
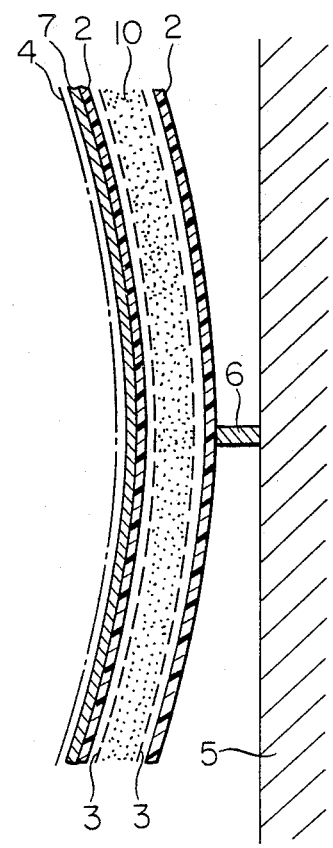

FIBER REINFORCED PLASTIC REFLECTOR

BACKGROUND OF THE INVENTION

This invention relates to a reflector made from a fiber reinforced plastic, and more particularly it relates to a reflector which is capable of reflecting light rays ranging in frequency from the infrared to the ultraviolet region.

FIGS. 1 and 2 are cross-sectional view of two conventional reflectors made from a fiber reinforced plastic (hereinunder abbreviated as FRP). Each of the reflectors has a core 1 which is made from a honeycomb material or a polymer foam. An FRP plate 2 is bonded by a bonding agent 3 to each side of the core 1. One example of a material for the FRP plates 2 is a carbon fiber reinforced plastic (abbreviated as CFRP). A reflecting film 4 which can reflect light rays ranging in frequency from the infrared to the ultraviolet region is formed on the other surface of one of the FRP plates 2 by vapor deposition or other suitable method. The reflector is rigidly supported by a base 5 through a support member 6 which is secured to both the base 5 and one of the FRP plates 2. The reflector of FIG. 2 further comprises a hard and smooth substrate 7 of glass, metal, or the like which is formed on one of the FRP plates 2 beneath the reflecting film 4.

When the core 1 of a conventional reflector like those illustrated in FIGS. 1 and 2 is a honeycomb core, due to the anisotropy of the honeycomb core with respect to mechanical and thermal properties, nonuniform deformation may take place in the form of saddle-shaped molding strains and thermal deformation. Even if the honeycomb core is divided into a plurality of members which are disposed with consideration given to the directionality of the properties of the honeycomb material, each of the members making up the honeycomb core is still anisotropic, and nonuniform molding strains and thermal deformation can not be completely eliminated. Furthermore, when the honeycomb core is divided up in this manner, the reflecting surface undergoes deformation due to lack of structural continuity. As a result, when the reflector is used to reflect light rays and form an image, a sharp image can not be obtained. Furthermore, when the reflector is used to reflect light rays which are emitted from the focus of the reflector, the reflector can not produce parallel light rays having a uniform intensity distribution.

On the other hand, when the core 1 is made of a polymer foam, since the foam is a uniform material, there are no nonuniform deformations. However, a polymer foam has a relatively high linear thermal expansion coefficient on the order of $3-7 \times 10^{-5}/°C.$, and the thermal deformation of the reflector is large compared to that of one having a honeycomb core made of aluminum, for example. Furthermore, a reflector of this type having a sandwich construction with a polymer foam as a core is disadvantageous in that it has a lower stiffness-to-weight ratio than one employing a honeycomb core.

SUMMARY OF THE INVENTION

It is therefore an object of the present invention to provide an FRP reflector which is not subject to nonuniform molding strains and thermal deformation and which at the same time has a high stiffness-to-weight ratio and undergoes only small thermal deformation.

An FRP reflector in accordance with the present invention has a sandwich construction and comprises a core and two FRP plates which are secured to opposite sides of the core. A reflecting film is formed on the outer surface of one of the FRP plates. The core of the reflector is chosen from an isotropic material having a low density and a lower linear expansion coefficient than a polymer foam. As a result of the isotropy of the core, it is not subject to nonuniform deformations. Furthermore, because of the low density and low linear expansion coefficient, the reflector has a high stiffness-to-weight ratio, undergoes little thermal deformation, and is lightweight.

In one form of the present invention, the core comprises a plate of an isotropic material selected from a foamed metal having a density of $0.1-1.0$ g/cm$^3$, uniform porous glass having a density of $0.05-1.0$ g/cm$^3$, and a uniform porous ceramic having a density of $0.3-1.0$ g/cm$^3$. In another form of the present invention, the core has a cardboard-like construction and comprises a corrugated sheet and a flat sheet which is secured to at least one side of the corrugated sheet. The corrugated sheet and the flat sheet are made of a material selected from a uniform Kevlar fiber reinforced plastic having a density of $0.03-1.0$ g/cm$^3$, a uniform ceramic having a density of $0.03-1.0$ g/cm$^3$, and a uniform carbon fiber reinforced plastic having a density of $0.03-1.0$ g/cm$^3$.

BRIEF DESCRIPTION OF THE DRAWINGS

FIG. 3 is a cross-sectional view of a first embodiment of an FRP reflector in accordance with the present invention.

FIG. 4 is a cross-sectional view of a second embodiment of an FRP reflectors in accordance with the present invention.

In the figures, the same reference numerals indicate the same or corresponding parts.

DESCRIPTION OF THE PREFERRED EMBODIMENTS

Figure 1:
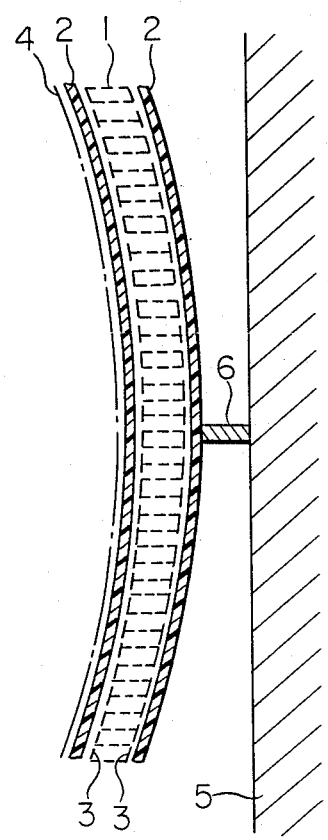
FIG. 1 is a cross-sectional view of a conventional FRP reflector.
Figure 2:
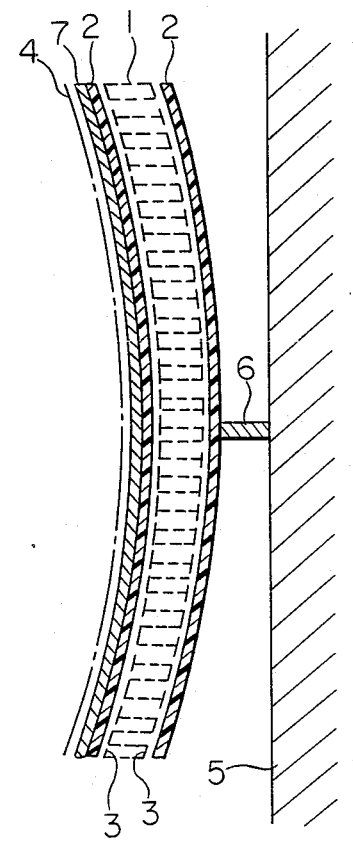
FIG. 2 is a cross-sectional view of another type of conventional FRP reflector.

Hereinbelow, a number of preferred embodiments of an FRP reflector in accordance with the present invention will be described while referring to the accompanying figures. FIGS. 3 and 4 respectively illustrate a first and a second embodiment of this invention. Like the conventional reflectors of FIGS. 1 and 2, each reflector has a sandwich construction and comprises a core 10 having to FRP plates 2 bonded by a bonding agent 3 to opposite sides thereof. The FRP plates 2 can be made of a carbon fiber reinforced plastic or other suitable FRP. A reflecting film 4 which can reflect light rays ranging in frequency from the infrared to the ultraviolet region is formed on the outer surface of one of the FRP plates 2 by vapor deposition or other suitable method. The reflector is secured to a base 5 by a support member 6 which is secured to one of the FRP plates 2. The reflector of the embodiment of FIG. 4 further comprises a hard and smooth substrate 7 of glass, metal, or the like which is formed on one of the FRP plates 2 beneath the reflecting film 4.

The cores 10 of the embodiments of FIG. 3 and 4 are made from an isotropic material selected from a uniform foamed metal such as foamed aluminum or foamed magnesium having a density of 0.1–1.0 g/cm$^3$, from a uniform, porous glass having a density of 0.05–1.0 g/cm$^3$, and from a uniform, porous ceramic having a density of 0.3–1.0 g/cm$^3$.

As these materials are isotropic with respect to mechanical and thermal properties, the reflector is not subjected to nonuniform molding strains or thermal deformation. These materials also have a lower linear thermal expansion coefficient than polymer foam of at most $1\times 10^{-5}/°C$., so that the resulting reflector is not subject to significant thermal deformation. Furthermore, a sandwich structure using these materials has a higher stiffness-to-weight ratio than one using a polymer foam, so that a lightweight reflector of high precision can be obtained.

Figure 5:
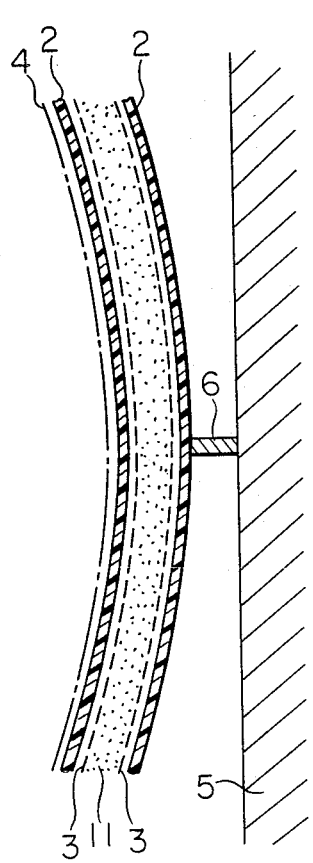
FIG. 5 is a cross-sectional view of a third embodiment of an FRP reflector in accordance with the present invention.
Figure 6:
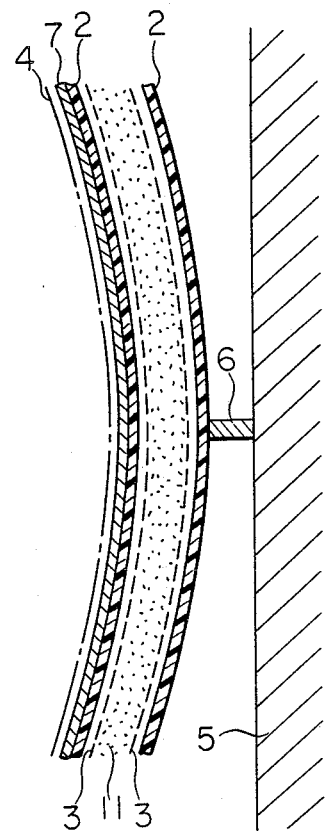
FIG. 6 is a cross-sectional view of a fourth embodiment of an FRP reflector in accordance with the present invention.

FIG. 5 and 6 respectively illustrate a third and a fourth embodiment and an FRP reflector in accordance with the present invention. These embodiments differ from those illustrated in FIG. 3 and 4, respectively, only in the structure of the core 11 thereof, which is illustrated in perspective in FIG. 7. The core 11 has a cardboard-like structure and comprises a corrugated sheet 11a having a flat sheet 11b secured to one side thereof. Both the corrugated sheet 11a and the flat sheet 11b are made from the same isotropic material which is selected from a uniform Kevlar fiber reinforced plastic (KFRP) having a density of 0.03–1.0 g/cm$^3$, a uniform ceramic having a density of 0.03–1.0 g/cm$^3$, and a uniform carbon fiber reinforced plastic having a density of 0.03–1.0 g/cm$^3$. Kevlar is a trademark of DuPont de Nemours & Co. for an aromatic polyamide fiber.

A cardboard-like core 11 made of one of these materials provides the same benefits as the core 10 of FIGS. 3 and 4. Namely, it is isotropic with respect to mechanical and thermal properties, so it is not subject to nonuniform molding strains or nonuniform thermal deformation. These materials also have a lower linear expansion coefficient than a polymer foam of at most $1\times 10^{-5}/°C$., so that the resulting reflector is not subject to significant thermal deformation. Furthermore, a sandwich structure using these materials has a higher stiffness-to-weight ratio than one using a polymer foam. Therefore, a lightweight reflector of high precision can be obtained.

Figure 7:
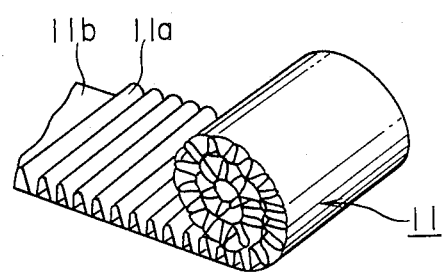
FIG. 7 is a perspective view of the core of the embodiments of FIGS. 5 and 6.

FIG. 7 illustrates the case in which a corrugated sheet 11a has a flat sheet 11b secured to only one side thereof, but it is also possible to secure a flat sheet 11b to both sides thereof.

In the above-described embodiments, the reflecting surface of the reflector has a concave shape, but there is no restriction on the shape thereof, and it can also be convex or flat.

What is claimed is:

1. A fiber reinforced plastic reflector comprising:
   a core which is made of an isotropic material with respect to mechanical and thermal properties selected from a uniform foamed metal having a density of 0.1–1.0 g/cm$^3$, uniform porous glass having a density of 0.05–1.0 g/cm$^3$, and a uniform porous ceramic having a density of 0.3–1.0 g/cm$^3$;
   two fiber reinforced plastic plates which are secured to opposite sides of the said core; and
   a reflecting film which is formed atop the outer surface of one of said fiber reinforced plastic plates;
   said core and said plastic plates having a linear thermal expansion coefficient of $\leq 1\times 10^{-5}/C$. and providing a lightweight reflector not subject to significant thermal deformation.

2. A fiber reinforced plastic reflector as claimed in claim 1 further comprising a smooth and hard substrate which is disposed atop said one of said fiber reinforced plastic plates beneath said reflecting film.

3. A fiber reinforced plastic reflector as claimed in claim 2 wherein said substrate is made from glass or metal.

4. A fiber reinforced plastic reflector as claimed in claim 2 wherein said core is foamed metal selected from foamed aluminum and foamed magnesium.

5. A fiber reinforced plastic reflector as claimed in claim 3 wherein said core is foamed metal selected from foamed aluminum and foamed magnesium.

6. A fiber reinforced plastic reflector as claimed in claim 1 wherein said core is a foamed metal selected from foamed aluminum and foamed magnesium.

7. A fiber reinforced plastic reflector comprising:
   a core comprising a corrugated sheet and a flat sheet which is secured to one side of said corrugated sheet, said corrugated sheet and said flat sheet being made of an isotropic material with respect to mechanical and thermal properties selected from a uniform Kevlar fiber reinforced plastic having a density of 0.03–1.0 g/cm$^3$, a uniform ceramic having a density of 0.03–1.0 g/cm$^3$, and a uniform carbon fiber reinforced plastic having a density of 0.03–1.0 g/cm$^3$;
   two fiber reinforced plastic plates which are secured to opposite sides of the said core; and
   a reflecting film which is formed atop the outer surface of one of said fiber reinforced plastic plates;
   said core and said plastic plates having a linear thermal expansion coefficient of $\leq 1\times 10^{-5}/C$. and providing a lightweight reflector not subject to significant thermal deformation.

8. A fiber reinforced plastic reflector as claimed in claim 7, further comprising a smooth and hard substrate which is disposed atop said one of said fiber reinforced plastic plates beneath said reflecting film.

9. A fiber reinforced plastic reflector as claimed in claim 8, wherein said substrate is made from glass or metal.

* * * * *

UNITED STATES PATENT AND TRADEMARK OFFICE
CERTIFICATE OF CORRECTION

PATENT NO. : 4,875,766
DATED : October 24, 1989
INVENTOR(S) : Shimodaira et al

It is certified that error appears in the above-identified patent and that said Letters Patent is hereby corrected as shown below:

On the title page :

[56]  References Cited

U.S. PATENT DOCUMENTS

Change "4,358,508" to read --4,358,507--;

Change "... Laroche et al.........428/417.1" to read
        --Laroche et al.......428/317.1--.

FOREIGN PATENT DOCUMENTS

Change "57-169102" to read --58-169102--;

Signed and Sealed this

Fourth Day of June, 1991

Attest:

HARRY F. MANBECK, JR.

*Attesting Officer*　　　　*Commissioner of Patents and Trademarks*